Sept. 20, 1960  K. E. PETERSON  2,953,288
RECEPTACLE DEVICE FOR MOUNTING ON AUTOMOBILE SEAT BACK
Filed Feb. 18, 1959

INVENTOR.
KENNETH E. PETERSON

United States Patent Office 2,953,288
Patented Sept. 20, 1960

2,953,288

RECEPTACLE DEVICE FOR MOUNTING ON AUTOMOBILE SEAT BACK

Kenneth E. Peterson, 2016 W. 83rd St., Minneapolis 20, Minn.

Filed Feb. 18, 1959, Ser. No. 794,149

4 Claims. (Cl. 224—42.46)

This invention relates to a receptacle device adapted to be removably mounted on the back of the front seat of an automobile and having a pair of hollow compartments positioned respectively on the front side and back side of the seat back.

It is an object of this invention to provide a receptacle device for personal articles, road maps, and the like which may be quickly and readily mounted upon and removed from the back of the front seat of an automobile, and which may be selectively positioned transversely thereof for the convenience of the occupants of the automobile.

It is another object to provide such a device which is adjustable to conformingly fit upon the upper portion of a seat back of any configuration and which is clamped in operative position thereon by a single narrow band of malleable metal which is secured to the device and is cushioned from direct contact with the upholstery.

It is another object to provide such a device which provides carrying receptacles readily accessible to both front seat and back seat passengers of the automobile and having a readily removable rigid lining to hold the receptacle open and maintain a flat-bottomed, hollow compartment therewithin.

It is still another object to provide such a device having auxiliary side pockets for separately carrying flat or fragile articles.

It is a further object to provide a receptacle device to be mounted on the back of the front seat of an automobile which is of compact and extremely inexpensive construction, and which may be readily and quickly collapsed for packaging and storing and which may also be used to carry articles to and from the automobile.

These and other objects and advantages of my invention will more fully appear from the following descriptions made in connection with the accompanying drawings, wherein like reference characters refer to the same or similar parts throughout the several views, and in which.

Figure 2:
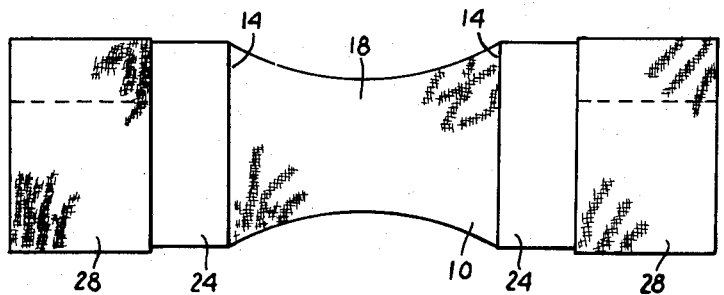
Fig. 2 is a plan view of the device shown in Fig. 1 having the connecting member laid flat and the compartment bags positioned in alignment therewith.
Figure 3:
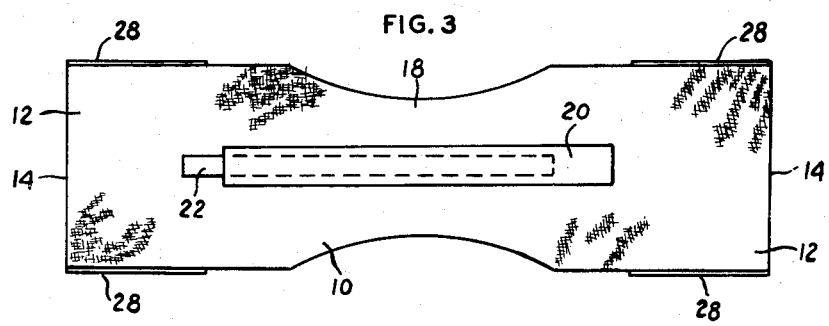
Fig. 3 is a bottom plan view of the back of the device positioned as shown in Fig. 2 and showing the clamping member partly inserted into the sleeve provided therefore.

In the form of the invention shown in the accompanying drawings the back member 10 of the device, as illustrated in Fig. 3, is composed of a single length of flexible material, such as canvas, which forms the back panels 12 of the carrying bag members 14, which are folded outwardly at generally right angles at the ends thereof to form the flat bottom 16. In the form shown the member 10 is narrowed in width at the central portion thereof which forms the connecting member 18 interconnecting the bag members 14. An elongated strip of the same flexible material is attached to the central portion of the member 10 on the sides and one end thereof to form a clamp holding sleeve 20. A malleable clamping member, such as the flat aluminum strip 22, may be removably inserted into the sleeve or pocket 20 which provides a protective covering to prevent the clamping member 22 from piercing or damaging the automobile upholstery.

The front and side portions 24 of the bag members 14, in the form shown, are composed of a single length of the same material as the member 10, and are attached thereto at the bottom and side portions thereof. A pair of rigid liners 26, such as stiff cardboard, are formed to fit into the bag members 14 and are removably inserted therein to maintain hollow flat-bottomed compartments therewithin and to keep the top of the bags spread open.

An auxiliary flat pocket member 28 of the same material and narrower in width than the member 24 is attached to the outside of each of the bag members 14 at the side and bottom thereof and also at intermediate portions thereof to provide a plurality of flat separated and more shallow compartments for separately carrying individual articles.

Figure 1:
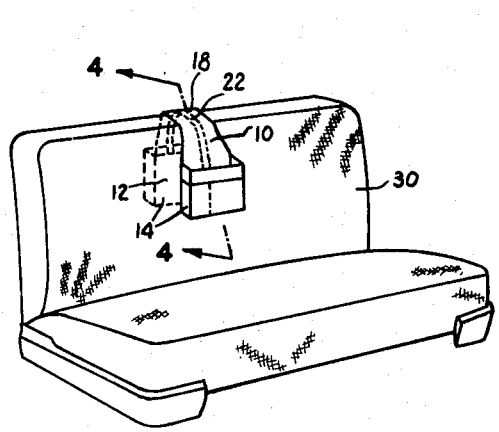
Fig. 1 is a perspective view of a carrying device embodying the present invention mounted in operative position upon the back of an automobile seat.
Figure 4:
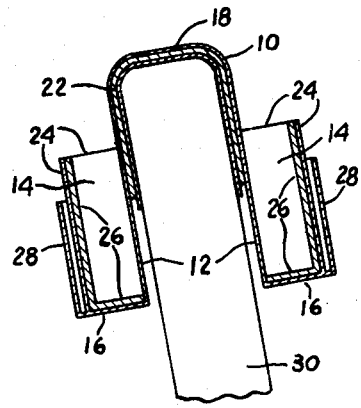
Fig. 4 is a vertical sectional view taken substantially along line 4—4 of Fig. 1.

The carrying device is placed in operative position with the bag members 14 respectively suspended from the member 18 on each side of the seat back, as best shown in Fig. 1, by placing the connecting member upon the portion of the back seat desired and pushing downwardly and inwardly upon the end portions of the clamping member 22 until the same is securely anchored upon the seat back 30 even when the weight load is unequally distributed between said bags. The receptacle device can be quickly and easily mounted and removed, and the clamping member 22 may be quickly removed to permit the device to be collapsed into a small compact bundle which may be easily placed out of the way when not in use. The carrying device may also be used for transporting the articles therein to and from the automobile.

It will be seen that I have provided a very simple yet very practical and useful receptacle device which is designed to be inexpensively constructed, which may be selectively positioned for the convenience of the automobile passengers, and which may be readily mounted and removed and collapsed for storing the same out of the way. Furthermore, the device will remain firmly anchored to the automobile seat back even when one of the carrying bags is bearing a substantially greater weight load than the other bag.

It will, of course, be understood that various changes may be made in the form, details, arrangement and proportion of parts without departing from the scope of my invention, which generally stated, consists in the matter set forth in the appended claims.

What is claimed is:

1. A receptacle device for personal articles and the like adapted to be mounted on the back of the front seat of an automobile, said receptacle device comprising a pair of carrying bags, a flexible connecting member interconnecting the tops of the bags and being of sufficient length to overlie the top of the seat back with the bags respectively suspended therefrom on each side of the seat back, a clamping member attached to said connecting member for clamping and anchoring the same onto the top of the seat back to securely anchor both of said bags in suspended relation thereto even when one of said bags is bearing a substantially greater weight load than the other bag.

2. The structure set forth in claim 1 and readily removable rigid lining means within each of said bags to hold the same open at the top and to form a hollow flat bottomed compartment therewithin.

3. The structure set forth in claim 2 and said clamping member comprising a single narrow elongated malleable strip of material, being removably mounted upon said connecting member to permit removal thereof for storing the carrying device, a sleeve element provided upon the connecting member for receiving and holding said clamping member, and said sleeve providing a protective covering for said clamping member to prevent the same from damaging the automobile upholstery.

4. A receptacle device for personal articles and the like adapted to be mounted on the back of the front seat of an automobile said receptacle device comprising a pair of carrying bags of flexible material, a flexible connecting member interconnecting the tops of said bags, the end portions of said connecting member respectively providing the bottoms and backs of each bag, said connecting member being of sufficient length to overlie the top of the seat back at the intermediate portion thereof with said bags suspended therefrom respectively on the front and the back of said seat back to provide receptacles for use by both front and back seat passengers, an elongated flexible sleeve member longitudinally attached to one side of said connecting member, the ends of said sleeve member extending respectively to an intermediate portion of the back of each of said pair of bags, said sleeve being open at one end, an elongated flat strip of malleable material slightly shorter than said sleeve being removably inserted axially into said sleeve, the ends of said malleable strip being pressed respectively against upper portions of the front and back surfaces of the seat back to securely anchor said bags thereupon even when one of said bags is bearing a substantially greater weight load than the other bag and to prevent said bags from shifting laterally or swinging outwardly from the seat back due to movement of the automobile, readily removable rigid lining means within each of said bags to hold the same open at the top and to maintain a hollow flat bottomed compartment therewithin, said linings and said strip of malleable material being readily removable to permit folding of said flexible bags and connecting member for storage thereof.

References Cited in the file of this patent

UNITED STATES PATENTS

| | | |
|---|---|---|
| 1,650,385 | Payton | Nov. 22, 1927 |
| 1,665,892 | O'Dea | Apr. 10, 1928 |
| 1,738,557 | Beiling | Dec. 10, 1929 |
| 1,839,862 | Bartlett | Jan. 5, 1932 |
| 2,640,596 | Reeder | June 2, 1953 |
| 2,807,371 | Johnson | Sept. 24, 1957 |